United States Patent
Schwoerer et al.

(10) Patent No.: US 7,751,515 B2
(45) Date of Patent: Jul. 6, 2010

(54) METHOD, SYSTEM AND RECEIVER IN RECEIVING A MULTI-CARRIER TRANSMISSION

(75) Inventors: Ludwig Schwoerer, Hattingen (DE); Andre Kaufmann, Bochum (DE); Jussi Vesma, Turku (FI)

(73) Assignee: Nokia Corporation, Espoo (FI)

( * ) Notice: Subject to any disclaimer, the term of this patent is extended or adjusted under 35 U.S.C. 154(b) by 915 days.

(21) Appl. No.: 10/572,806

(22) PCT Filed: Sep. 22, 2003

(86) PCT No.: PCT/FI03/00690

§ 371 (c)(1), (2), (4) Date: Oct. 5, 2006

(87) PCT Pub. No.: WO2005/029802

PCT Pub. Date: Mar. 31, 2005

(65) Prior Publication Data

US 2007/0053448 A1     Mar. 8, 2007

(51) Int. Cl.
H04L 7/00    (2006.01)

(52) U.S. Cl. ............... 375/354; 375/316; 370/206; 370/500; 370/503

(58) Field of Classification Search ........... 375/130, 375/142, 150, 259–260; 370/206, 210, 491, 370/500
See application file for complete search history.

(56) References Cited

U.S. PATENT DOCUMENTS

| | | | |
|---|---|---|---|
| 5,867,478 A * | 2/1999 | Baum et al. | 370/203 |
| 6,470,030 B1 | 10/2002 | Park et al. | |
| 7,317,749 B2 * | 1/2008 | Song | 375/142 |
| 2003/0039228 A1 * | 2/2003 | Shiu et al. | 370/331 |
| 2003/0142764 A1 | 7/2003 | Keevill et al. | |

FOREIGN PATENT DOCUMENTS

| | | |
|---|---|---|
| EP | 0903898 A2 | 3/1999 |
| EP | 1 195 961 A2 * | 10/2002 |
| EP | 1267535 A1 | 12/2002 |
| GB | 2368250 A | 4/2002 |

OTHER PUBLICATIONS

Michael Speth et al., "Optimum Receiver Design for OFDM-Based Broadband Transmission—Part II: A Case Study", IEEE Transactions on Communications, vol. 49, No. 4, Apr. 2001, pp. 571-578.
Ludwig Schwoerer et al., "Fast Scattered Pilot Synchronization for DVB-T and DVB-H", Proc. $8^{th}$ International OFDM Workshop, Hamburg, Germany, Sep. 24-25, 2003, 5 pgs.
PCT International Search Report of International Application No. PCT/FI2003/000690, Date of Completion of Search—Feb. 24, 2004.
Digital Video Broadcasting (DVB); Framing Structure, Channel Coding and Modulation for Digital Terrestrial Television; European Telecommunications Standards Institute; (Telecommunications Series) EN 300 744 V1.1.2 (Aug. 1997); pp. 1-47.

* cited by examiner

Primary Examiner—Jean B Corrielus
(74) Attorney, Agent, or Firm—Locke Lord Bissell & Liddell LLP

(57) ABSTRACT

Mobile handheld terminals receiving DVB transmission require relatively low power consumption and TDM based transmission can be used to reduce power of the terminals. In order find pilot carrier position at least two symbols are accessed which are adapted to establish a correspondence pattern for pilot carriers in a matrix of the at least two symbols. Carriers of the first symbol are correlated with the corresponding carriers of the second symbol within the matrix for determining a correlation maximum for indicating a pilot carrier position.

19 Claims, 11 Drawing Sheets

METHOD, SYSTEM AND RECEIVER IN RECEIVING A MULTI-CARRIER TRANSMISSION

This application is a 371 of PCT/FI03/00690, filed Sep. 22, 2003.

TECHNICAL FIELD OF THE INVENTION

The present invention relates to a method, a system and a receiver in receiving a multi-carrier transmission.

BACKGROUND ART

Services used in mobile handheld terminals require relatively low bandwidth. Estimated maximum bitrate for streaming video using advanced compression like MPEG-4 is in order of a few hundred kilobits per second.

A DVB-T (Terrestrial Digital Video Broadcasting) transmission system usually provides data rates of 10 Mbps or more. This provides a possibility to significantly reduce the average DVB-T receiver power consumption by introducing a schema which can be based on time division multiplexing (TDM). The introduced scheme can be called a time slicing.

An idea of time-slicing is to send data in bursts using significantly high bandwidth at once. The enables a receiver to stay active only a fragment of the time, while receiving bursts of a requested service. An example of the time slicing can be depicted in FIG. 1. So the original possibly streaming data can be sent as burst with high bandwidth load. Two time slice bursts (100, 101) are depicted each burst having their respective synchronization portion (102) and data portion carrying the service (103).

The received data can be buffered. For example, if an applicable constant lower bitrate is required by the mobile handheld terminal, this may be provided by buffering the received bursts. Thus the data used by the end-application can be applied even as a stream by unpacking data in the buffer(s).

For an exemplary burst size of 2 Mbit and a DVB-T bitrate of 15 Mbps, the burst duration is 146 ms. If the constant bitrate (the bitrate at which the burst is read out of the buffer) is 350 kbps (e.g. one streaming service with high quality video), the average time between bursts is 6.1 s.

As the total on-time is the addition of the synchronization time plus the burst duration, synchronization times of the handheld receiver must be rigorously minimized in order to better exploit the potential of time-slicing.

So the technical use of TDM based system such as time slicing to cut power consumption to a reasonable number is generalizing for a DVB handheld environment. Therefore, in order to better exploit the potential power reduction, synchronization times of such a receiver should be decreased. A faster synchronization is desirable.

An approach for a multi-carrier transmission synchronization according to the prior art, will hereinafter be described.

Typical DVB-T Synchronization According to Prior Art

A typical DVB-T synchronization scheme until Channel Estimation is sketched a in a standardization publication: "Digital Video Broadcasting (DYB)", ETS 300 744, chapter 4.4 incorporated herein by reference. This typical synchronization scheme is depicted in FIG. 2. After start-up, the first step of synchronization is a Pre-FFT (Fast Fourier Transform) synchronization (200). As all metrics at this stage are derived from a guard interval correlation, a typical synchronization time of two OFDM (Orthogonal Frequency Division Multiplex) symbols is inherent.

For Subsequent Post-FFT synchronization (201), taking into account, that the first OFDM symbol is available for Post-FFT synchronization after the latency of the FFT (typically 3 OFDM symbols) a typical synchronization time of 4-5 OFDM symbols is related to this phase.

After carrier and timing synchronization have been achieved, the position of scattered pilots within an OFDM symbol has to be determined before the channel estimation can be started. As the scattered pilot position is directly related to the OFDM symbol number within the OFDM frame, no dedicated scattered pilot synchronization is typically included in prior art DVB-T receivers, but the anyhow available TPS-bit-based OFDM frame synchronization (202) instead. As a consequence, this implies a variable minimum synchronization time of 17 to 68 OFDM symbols. For DVB-H (DVB in handheld mobile terminal environment) time-slicing purposes this means the receiver must prepare for the later one, thus 68 OFDM symbols synchronization time have to be reserved. All in all, this accounts for 75 OFDM symbols synchronization time until Channel Estimation (CHE, 203) can be started. Assuming 8 k mode, this translates into 69-84 ms depending on the length of the guard interval. Taking only this part of the synchronization time (Channel Estimation omitted), already this 84 ms is quite impressive compared to 146 ms burst duration. 37% of the total on-time is just for this part of the synchronization, most of it resulting from the TPS (Transmission Parameter Signalling) synchronization (202).

Another approach for a multi-carrier transmission synchronization according to the prior art, will hereinafter be described.

A patent publication EP 1 267 535 A1 cites a prior art based approach relying on a system where scattered pilot detector decides the mode of each scattered pilot and compares the sums of powers of subcarriers corresponding to each scattered pilot mode with one another based on the feature that a pilot has greater power than usual data to detect a mode having greatest power among the modes.

In view of various limitation of the synchronization into a multi-carrier transmission, it would be desirable to avoid or mitigate these and other problems associated with prior art. Thus, there is a need for relatively fast and yet quite reliable synchronization.

SUMMARY OF THE INVENTION

Now a method, a system and a receiver have been invented to relatively fast and quite reliably synchronize into multi-carrier transmission or a portion of it.

In accordance with aspects of the invention, there is provided a method and a system for receiving a multi-carrier transmission, wherein the multi-carrier transmission comprises various symbols, each symbol comprising a plurality of carriers, wherein:

at least two symbols are accessed which are adapted to establish a correspondence pattern for pilot carriers in a matrix of the at least two symbols, carriers of the first symbol are correlated with the corresponding carriers of the second symbol within the matrix for determining a correlation maximum for indicating a pilot carrier position.

In accordance with yet another aspect of the invention, there is provided a receiver for receiving a multi-carrier transmission, wherein the multi-carrier transmission comprises various symbols, each symbol comprising a plurality of carriers, the receiver comprising:

a Fast Fourier Transform (FF) means for FFT transformation of the received transmission for obtaining at least two symbols of the transmission, a delay means for delaying an obtained first symbol to obtain another symbol, wherein a matrix, comprising the symbols and their respective carriers, is adapted to establish a correspondence pattern for pilot carriers of the first symbol with pilot carriers of the another symbol within the matrix, a correlator means for correlating carriers of the symbol with the corresponding carriers of the another symbol within the matrix, accumulator means for accumulating correlation results obtained from the correlator, means for detecting a correlation maximum from the correlation results for indicating a pilot carrier position.

Some embodiments of the invention can find the position of scattered pilots within an OFDM symbol quite fast and yet reliably.

In various embodiments, a synchronization can be based on realizing, that certain identifiable carriers such as scattered pilot carriers can be found at the same standardised positions (i.e. the same carrier index) every standardised symbol. These pilot carriers are highly correlated, while other carriers such as data carriers are not. By sensing possible raster positions of the pilot carriers, a clear distinct correlation magnitude maximum can be found for the current pilot carrier position. A certain symbol can be identified based on the pilot carrier position.

Various embodiments of the invention give an very fast way of obtaining the identifier(s) for certain symbol number in the multi-carrier transmission stream. This suffices to proceed with the further channel estimation and synchronization process. As an overall result, the whole synchronization phase of the receiver can be quite dramatically reduced. This is advantageous for mobile receivers, which are operating in TDM based power saving mode.

Advantageously synchronization time (i.e. until the Channel Estimation) can be significantly reduced. Preferably, some embodiments may work under all relevant channel conditions making the embodiments feasible. Advantageously the scattered pilot raster position of an OFDM symbol can be found reliably. Thus, the embodied invention can safely substitute the prior art TPS based OFDM synchronization. Also the complexity needed for embodied invention can be relatively low since most of the required computational resources are anyhow available from the post FFT-acquisition, and therefore applicable. However, the post FFT-acquisition computational resources are not mandatory implementations. For example, a more specific design can be applied as well, or other used circuitry of the receiver applied.

For better understanding of the present invention, together with other and further objects thereof, reference is made to the following description, taken in conjunction with the accompanying drawings, and its scope will be pointed in the appending claims.

BRIEF DESCRIPTION OF THE DRAWINGS

The invention will now be described, by way of example only, with reference to the accompanying drawings, in which.

DETAILED DESCRIPTION OF THE EMBODIMENTS

Thus the following description of the various embodiments, reference is made to the accompanying drawings which form a part hereof, and in which are shown by way of illustration various embodiments in which the invention may be practiced. It is to be understood that other embodiments may be utilized and structural and functional modifications may be made without departing from the scope of the present invention.

Multi-Carrier Signal Receiving and Fast Scattered Pilot Synchronization

Figure 1:
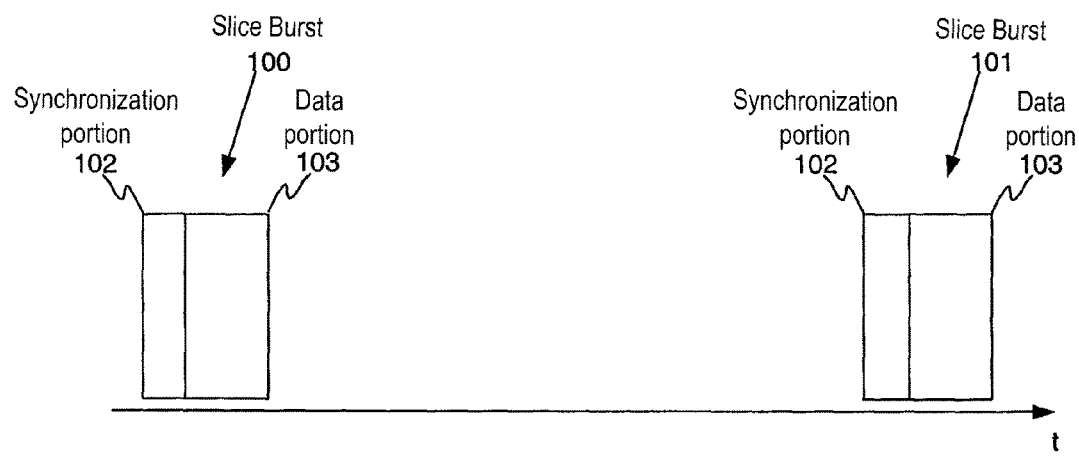
FIG. 1 depicts an example of the time slicing concept according to prior art.
Figure 2:
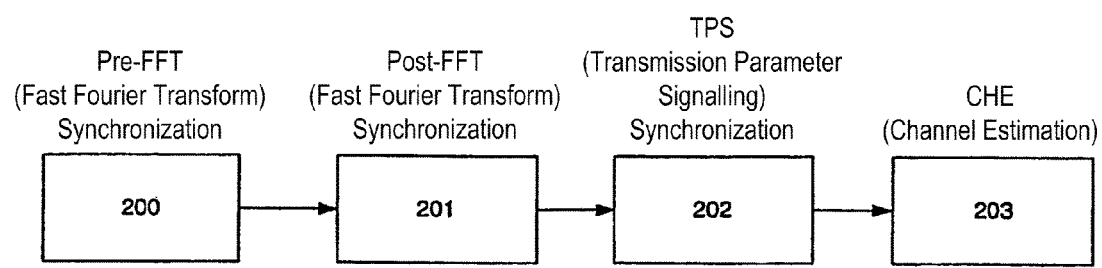
FIG. 2 depicts an example of DVB-T synchronization sequence according to prior art.
Figure 3:
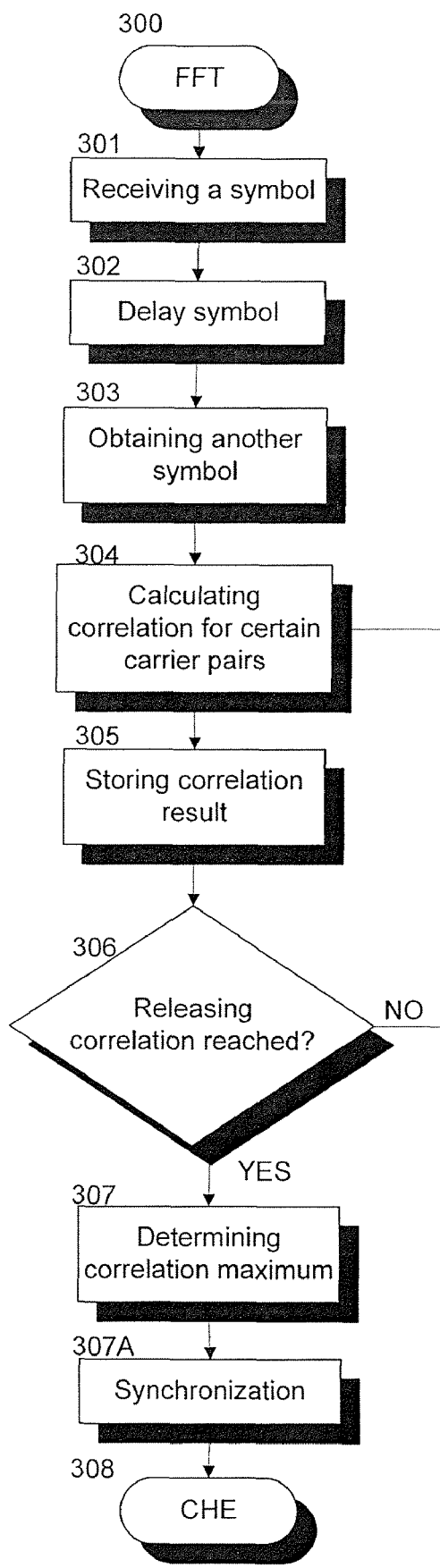
FIG. 3 depicts in a form of a flow chart a method for a receiving a signal in accordance with an embodiment of the invention.

FIG. 3 depicts in a form of a flow chart a method for a receiving a signal in accordance with some embodiments of the invention. The method start by receiving a multi-carrier transmission and performing a Fast Fourier Transform (FFT) for the received signal in the step 300.

Various embodiments of the invention apply a method for receiving a multi-carrier signal such as OFDM signal. This is advantageous since the multi-carrier transmission has awoken great deal of interest. The multi-carrier transmission preferably has a certain scattered raster pilot positions scheme. The multi-carrier such as the OFDM signal can be used in DVB. Further the multi-carrier signal is applicable in other systems as well such as mobile phone technology, other digital television systems such as e.g. ISDB (Integrated Services Digital Broadcasting) and in DAB (Digital Audio Broadcasting). In yet some cases the multi-carrier transmission, e.g. OFDM, is embodied in mobile DVB or in IP over mobile DVB environment. The embodied mobile DVB environment can be referred to as DVB-H (DVB handheld) or earlier sometimes DVB-X also. The multi-carrier transmission is received at the receiver. Because of the power saving aspects, the time-slicing concept is preferably applied for saving the power of the receiver, which preferably can be a mobile one. In the time slicing the transmission takes place in form of bursts. Correspondingly the receiver can receive and adapt to possibly certain bursts. The synchronization into bursts should be fast and reliable enough. Some further embodiments of the invention are related to the scattered pilot scheme of DVB-T/DVB-H. The same principle may also be applied to similar pilot schemes.

In some cases, during synchronization of the receiver the symbol number (e.g. in OFDM: 0 to 67) has to be found. For every symbol number, the position of the scattered pilots is defined. Scattered Pilots are used for Channel Estimation and Fine-Timing. Therefore, these operations can only be started after the position of the scattered pilots is known. So during synchronization of the receiver, the position of the scattered pilots within the symbols should be determined in order to start the channel estimation.

Thus, in various embodiments of the multi-carrier signal reception, after carrier and timing synchronization have been achieved, the position of scattered pilots within an OFDM symbol has to be determined before the channel estimation can be started. As the scattered pilot position is directly related to the OFDM symbol number within the OFDM frame, no dedicated scattered pilot synchronization is typically included in standard DVB-T receivers.

Referring back to the example of FIG. 3, after the FFT of step 300, a symbol is obtained and received in step 301. The received symbol is now delayed to some extent in time dependent way in the step 302. The received symbol can be delayed preferably to certain another symbol. In the step 303, the another symbol is received.

In various embodiments, the symbols are transmitted in a certain predetermined sequenced manner, typically based on standard. Various embodiments of the invention relates to receiving the symbols and how to process them. The symbol can be received and saved. The received symbol can be delayed to obtain another symbol. The symbols are transmitted continuously so that a received symbol relates to a certain point in time and another delayed point in time relates to another symbol.

Yet various embodiments of the invention present an approach to determine the scattered pilot position with a fixed synchronization time of some OFDM symbols. Preferably five or four symbols are applied depending on the definition of applied symbols. Thus, the embodiments allow to proceed with channel estimation and subsequent tasks while OFDM frame synchronization is still being pursued.

Referring back to the example of FIG. 3, after at least two different symbols are received, a correlation is calculated for carrier pairs in the step 304. Preferably the carriers for the correlation are selected from the different symbols, i.e. certain carriers of the first symbol and certain carriers of the another symbol. The selection of the certain carriers is advantageously based on the correspondence pattern between pilot carriers of the first symbol and pilot carriers of the another symbol. The correlation result is stored, preferably to accumulator in the step 305.

In some embodiments there is one accumulator for each possible scattered pilot position (e.g. 4 in DVB-T/DVB-H). So, the correlation result can be added to only that one of these, to which the tested carrier belongs to in the embodiments.

Referring back to the example of FIG. 3, in the step 306, there is being tested if releasing correlation has been reached. So the loop of the steps 304, 305 and 306 can be performed until certain releasing index is reached. If it is not, a next correlation for certain different carriers of these two symbols is calculated according to steps 304 and 305. Preferably, the releasing correlation index and the number of the another symbol (another compared to the first received) is selected in such a way that a certain predetermined known correspondence pattern is established for pilot carriers (positions) in a matrix comprising carriers of these two symbols. Thus the amount of correlations and the number of the another symbol can be based on the known correspondence pattern for pilot carriers (positions) in the matrix having carriers of these two symbols.

Various embodiments are based on the idea, that scattered pilots of the multi-carrier signal can be found at the certain same position every predetermined OFDM symbol. For example, the same carrier index can be indicated the position of the pilot carrier. Also the pilot carrier repetition pattern in a symbol can advantageously repeat after certain amount of symbols, for example every fourth symbol. These scattered pilots are highly correlated, while data carriers are not.

In some embodiments, correlations for a certain carrier pair can be calculated. The result is stored into a memory. A condition of a releasing carrier index is being checked. If the releasing carrier index is not reached, the calculation and the storing is continued. For example, various carriers of the symbols are processed. If the releasing index is reached, the memory is processed. Accordingly based on correlation metrics, certain amount of final correlations are calculated. Final correlations can be calculated in such a way that certain correlation calculation pairs are summed. The final correlation result having the maximum, selected from the final correlations, shows the pilot carrier position.

Referring back to the example of FIG. 3, a correlation magnitude maximum is determined for the calculated correlations in the step 307. Preferable, a clear distinct correlation magnitude maximum is found for the correlation indicating the pilot carriers indexes because the scattered pilots are highly correlated, while other data carriers are not. The determination or the comparison of the step 307 is performed for the correlations calculated in the loop 304, 305 and 307.

Thus by sensing possible raster positions of the scattered pilots, a clear distinct correlation magnitude maximum is found for the current scattered pilot raster position.

For example the certain substantially similar scattered pilot raster position is periodically repeated every fourth OFDM symbol. By sensing the four possible scattered pilot with four correlation metrics, the current scattered pilot raster position is determined by the highest magnitude out of these four.

Referring back to the FIG. 3, the synchronization and the channel estimation (CHE) may now continue in the receiving process in the steps 307A and 308, respectively.

Some embodiments of the invention give a significantly fast way of obtaining the two Least Significant Bits (LSBs) of the OFDM symbol number in a DVB-T/DVB-H data stream. The two LSBs suffice to proceed with the further channel estimation and synchronization process.

Figure 6:
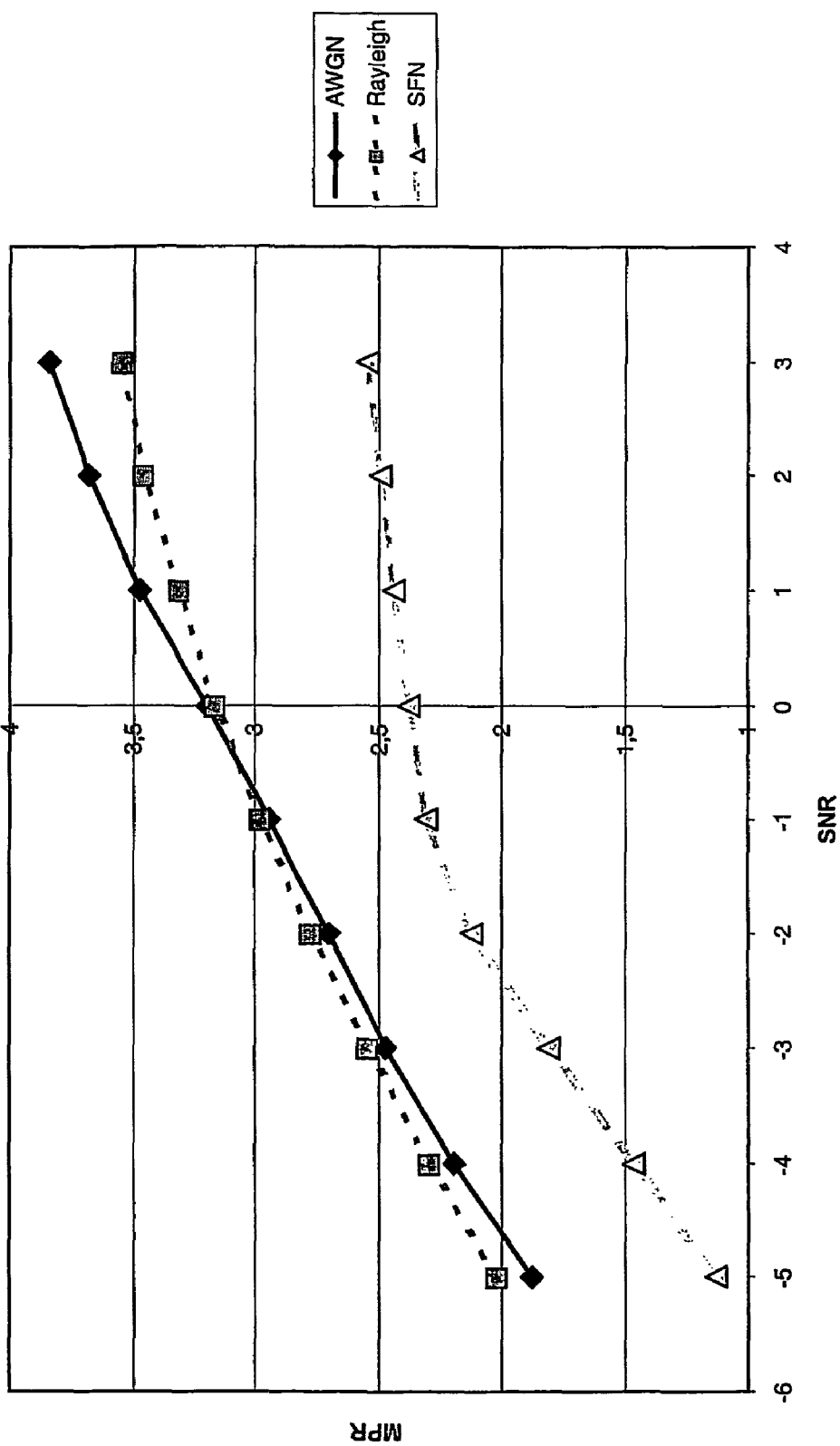
FIG. 6 depicts an example of simulation results for minimum protection rations for various channel conditions in accordance with some embodiments of the invention.
Figure 7:
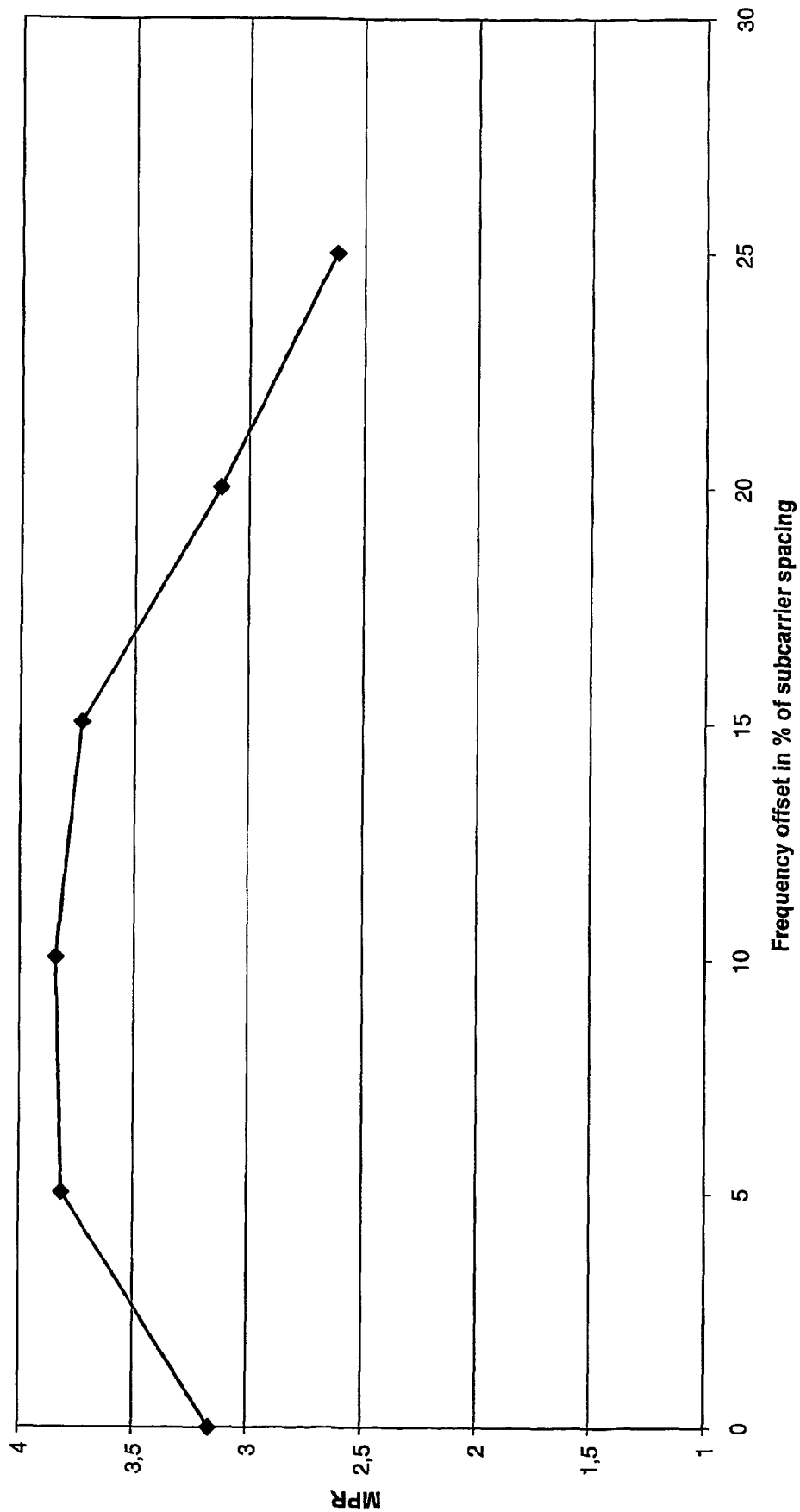
FIG. 7 depicts an example of simulation results for minimum protection ration vs. fractional carrier frequency offset in accordance with some embodiments of the invention.
Figure 8:
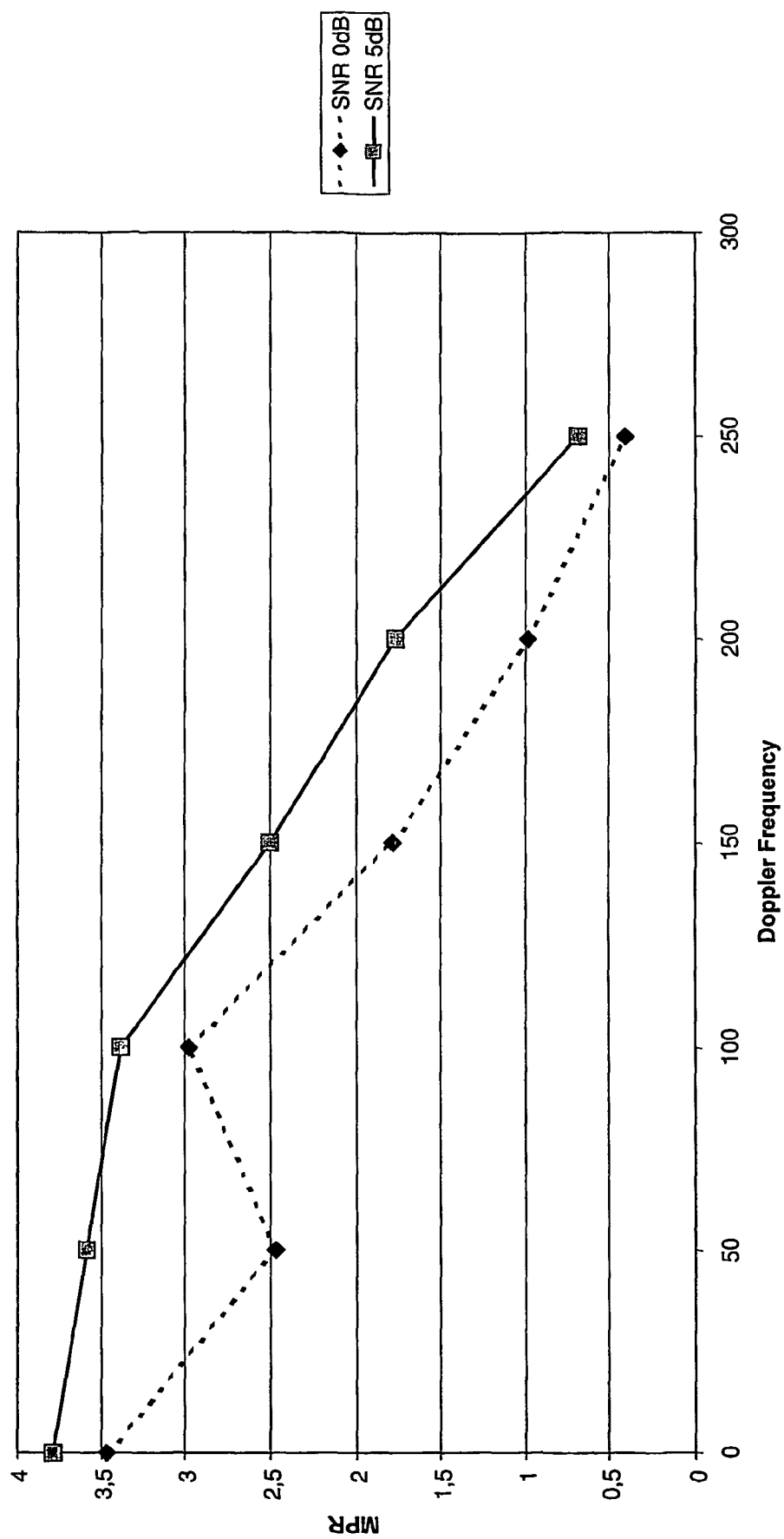
FIG. 8 depicts an example of simulation results for minimum protection rations vs. Doppler frequency in accordance with yet some embodiments of the invention.

Many simulation results can indicate that various embodiments are robust even under extreme channel conditions, as shown, for example, in simulations of FIGS. 6, 7 and 8 for 5% carrier frequency offset, 100 Hz Doppler and 0 dB SNR.

Advantageously, as an overall result, the whole synchronization phase of the receiver is dramatically reduced. This is especially important for DVB-H receivers, which are operating in time-slice mode and in which the power is of great importance. Thus variedly embodied synchronization techniques: fast scattered pilot synchronization can speed up the synchronization time of a DVB-T/H receiver drastically by up to 84%. Especially for a DVB-H receiver working in time-slicing mode, this gives an important reduction in power consumption. By simulation it can be shown, that for all relevant operation conditions the scattered pilot raster position of an OFDM symbol is found reliably. Thus, the fast scattered pilot synchronization can safely substitute the TPS base OFDM frame synchronization. Preferably, the potential of the time-slicing can be better exploited as the synchronization times of the receiver is significantly minimized under various circumstances.

Various Fast and Reliable Scattered Pilot Synchronizations

Figure 4:
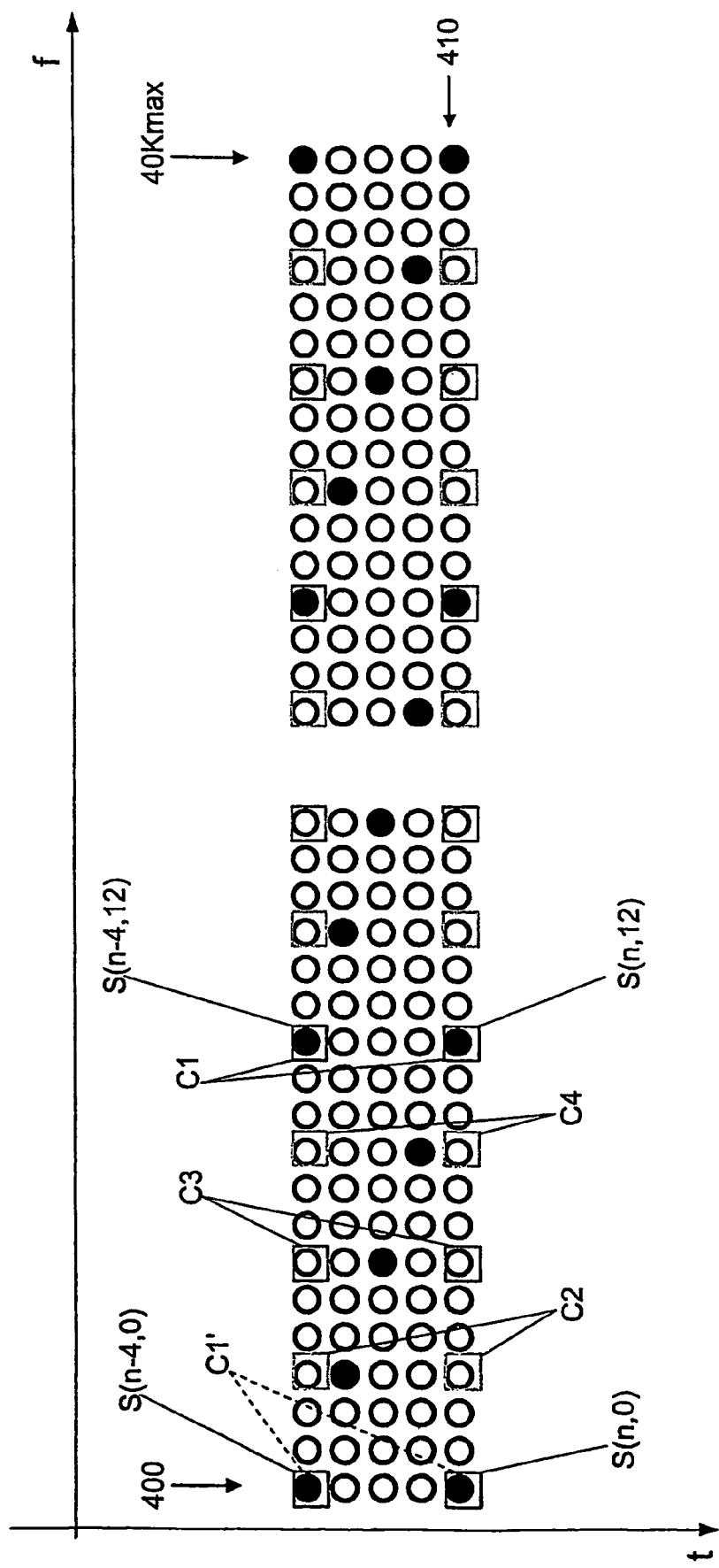
FIG. 4 depicts an example of scattered pilot positions where carriers correlations are adapted to be applied in accordance with some embodiments of the invention.

FIG. 4 depicts an example of scattered pilot positions where carriers correlations are adapted to be applied in accordance with some embodiments of the invention. With some embodiments of the invention proposing a fast scattered pilot synchronization, the position of the scattered pilots within the OFDM symbol, and thus the two LSBs of the OFDM symbol number, is found after a fixed delay of five OFDM symbols. Since synchronization can only proceed after this position is found, a speed-up of up to 63 OFDM symbols (i.e. ≈63 ms in 8 k mode) is achieved compared to the TPS based solution. For the time-slicing, this is the relevant number, because the DVB-H time-slicing receiver must prepare for the worst-case delay in order to guarantee synchronization.

So in some further embodiments of the invention it is proposed to use a correlation based fast scattered pilot synchronization to cut down the time needed for scattered pilot synchronization to just five OFDM symbols. The process utilizes the fact, that after four OFDM symbols the scattered pilot raster position repeats.

The position of scattered pilots can be, for example, given in the standard publication "Digital Video Broadcasting (DVB)", ETSI ETS 300 744, incorporated herein by reference, as:

For the symbol of index 1 (ranging from 0 to 67), carriers for which index k belongs to the subset $\{k=K_{min}+3\times(1 \bmod 4)+12p/p \text{ integer}, p \geq 0, k \in [K_{min}; K_{max}]\}$ are scattered pilots. Where p is an integer that takes all possible values greater than or equal to zero, provided that the resulting value for k does not exceed the valid range $[K_{min}; K_{max}]$. $K_{min}$ is 0, and $K_{max}$ is 1704 for the 2 k mode, (3408 for the 4 k mode), and 6816 for the 8 k mode.

FIG. 4 illustrates the position of the scattered pilots (shown as dark spots). The data carrier are depicted as circles in the example. A horizontal axis denotes frequency (f). Thus the entire horizontal row depicts a symbol, i.e. a symbol (410). A vertical axis denotes time (t). The vertical rows depicts carriers with the same index (K). For example, carriers (400) denoting Kmin to carriers (40 Kmax) denoting Kmax. So the symbols transmission/reception is time dependent, and the different carriers in a symbol are frequency dependent.

In some DVB standardised example there are symbols with numbers 0 to 67 (in total 68 symbols). The symbols are indexed with numerical order. So these arrive at different time. In the DVB example, the K-value depend on applicable modes and can be for example 2 k ($K_{min}=0-K_{max}=1704$), also 4 k ($K_{min}=0-K_{max}=3408$), and 8 k ($K_{min}=0-K_{max}=6816$). So the carriers within a symbol arrive using different frequencies.

Preferably, a correspondence pattern is established for the pilot carriers (dark spots) in the example of FIG. 4. This is advantageously shown as diagonal lines of pilots are established in the FIG. 4. Moreover, certain indexes of carriers of different symbols have the similar appearance within their respective symbol.

Some embodiments of the fast scattered pilot synchronization utilizes the fact, that after four OFDM symbols the scattered pilot raster position repeats. These scattered pilots are highly correlated, while data carriers are not.

In the example, having access to both the current and the last but fourth OFDM symbol, four correlations are performed for the four possible scattered pilot raster positions.

Still referring to FIG. 4, S(n,c) denotes the c-th subcarrier of the current OFDM symbol (index n) as a complex number. In the FIG. 4, examples S(n−4,0), S(n,0), S(n−4,12) and S(n, 12) are shown for depicting some of the following formulas. It should be noted that for the sake of clarity only first positions of correlations C1, C1', C2, C3, and C4 (possible pilot carrier positions) according to the formulas are depicted. The other position can be obtained based on the given formulas running the index p further. The four correlations can be given as:

$$C_1(n) = \left| \sum_{p=0}^{P_{max}} S(n, 12p+12) \cdot S^*(n-4, 12p+12) \right|$$

$$C_2(n) = \left| \sum_{p=0}^{P_{max}} S(n, 12p+3) \cdot S^*(n-4, 12p+3) \right|$$

$$C_3(n) = \left| \sum_{p=0}^{P_{max}} S(n, 12p+6) \cdot S^*(n-4, 12p+6) \right|$$

$$C_4(n) = \left| \sum_{p=0}^{P_{max}} S(n, 12p+9) \cdot S^*(n-4, 12p+9) \right|$$

with $p_{max}=141$ for the 2 k mode, 283 for 4 k mode and 567 for 8 k mode.

With this definition of the correlations, all four take the same number of carriers into account.

Another alternative would be to define $C_1'$ as:

$$C_1'(n) = \left| \sum_{p=0}^{P_{max}} S(n, 12p) \cdot S^*(n-4, 12p) \right|$$

By sensing all four possible raster positions of the scattered pilots, a clear distinct magnitude maximum $$C_{max}(n) = \max(C_p(n)); p \in \{1,2,3,4\}$$

is found for the current scattered pilot raster position (SPRP)

$$SPRP(n) = \arg\max_p (C_p(n)); p \in \{1, 2, 3, 4\}.$$

Preferably, the SPRP clearly indicates the position of the pilot, thereby enabling a symbol to be recognized.

The examples of the formulas $C_1$, $C_2$, $C_3$, $C_4$ and $C_1'$ can produce numerical real values. However, in some further embodiments complex and/or the numerical values can be applied, i.e. the values can represent absolute values of i/q-parameters.

The indexes in the formulas can be adopted to correspond with the scattered raster pilot positions of the applied pattern. Thus the FIG. 4 depicts an example only and do not limit the invention to the specific pattern of FIG. 4. Also the pilot positioning can be such that the same carrier index in different symbols may not necessary correspond but i.e. different carrier indexes of different symbols corresponds. All that this would require, is the predetermined regular known pattern for scattered raster pilot positions that the formulas can be adopted to the predetermined regular known pattern in question.

In the depicted example of FIG. 4, the correlations $C_1$ and $C_1'$ have the maximum. Accordingly, a certain symbol can be deduced to be the currently received symbol based on this correlation.

The time needed for some embodiments of the fast scattered pilot synchronization can advantageously be only five OFDM symbols. Thus in total (including Pre- and Post-FFT synchronization) 12 OFDM symbols. For 8 k mode, this translates into 11-13.4 ms. With these numerical values only 8% of the total on-time is needed until channel estimation. Compared to standard TPS synchronization, this is an improvement of 84%.

Simulation Results

Several simulations can be done to show the effectiveness and robustness of various embodiments of the synchronization scheme.

A complete system environment has been built up in Synopsys' CoCentric System Studio, that comprises a complete DVB-T/H transmitter and a bit-true DVB-T/H receiver. The Synopsis CoCentric System is an example of a program that can be used to simulate various embodiments of the invention. In this instance it was used to create a complete simulation of a DVB-T/H transmitter and a bit-true DVB-T/H receiver model. Information regarding such programs is available via the Internet. The channel model allows to chose between several profiles, such as AWGN (Add White Gaussian Noise) or a mobile channel with AWGN. The implementation of the tap generation process for mobile channel is based on 'Channel Simulator I: Direct Form'.

Figure 5:
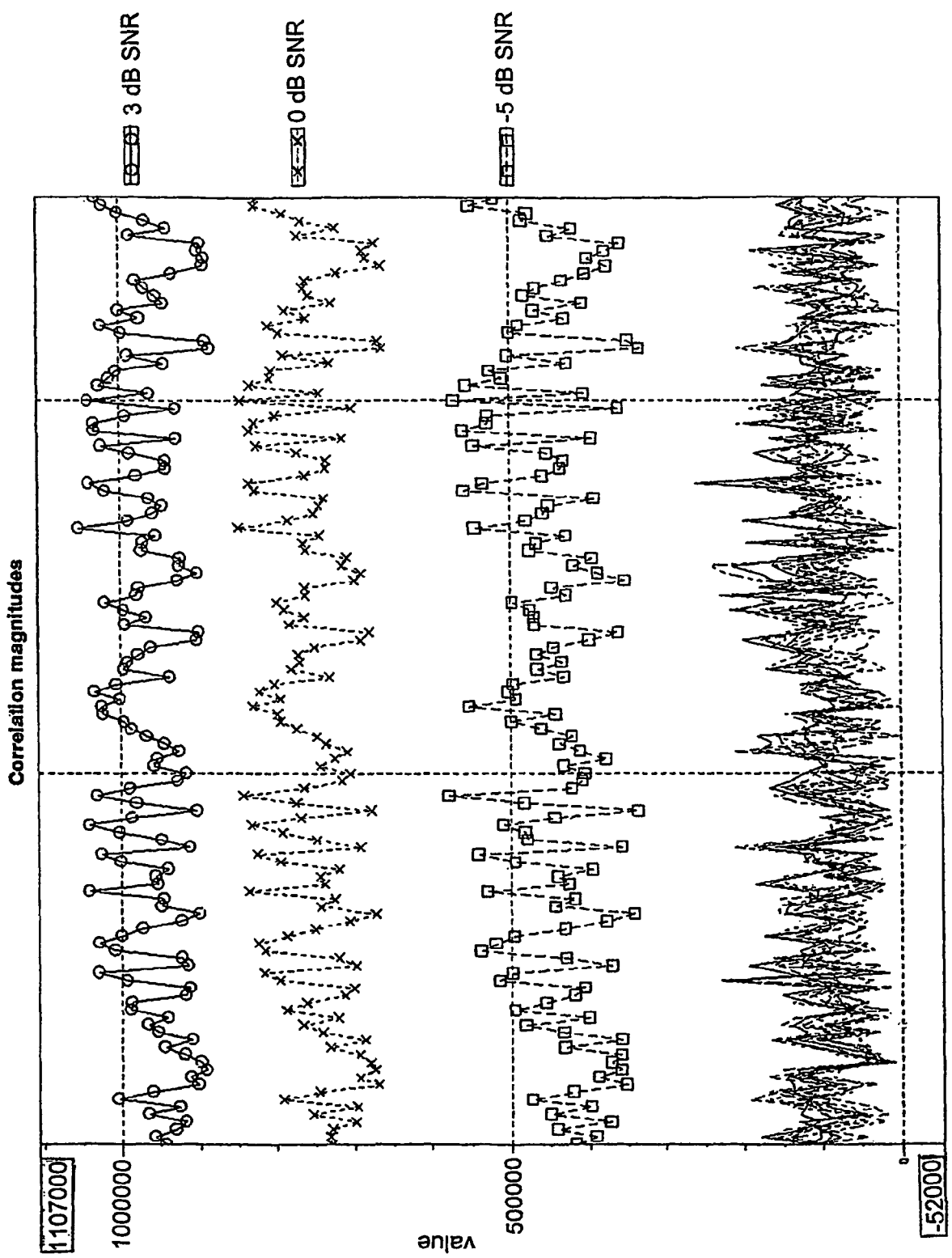
FIG. 5 depicts an example of simulation results for correlation results in accordance with some embodiments of the invention.

FIG. 5 shows an example of simulation for various embodiments of the invention with the results for 128 consecutive runs of scattered pilot synchronization at different levels of AWGN.

In the FIG. 5 three examples are given with 3 dB SNR, 0 dB SNR and −5 dB SNR. Obviously, the level of $C_{max}(n)$ increases with increasing SNR (shown in FIG. 6 by the three topmost curves, which correspond to matching scattered pilot raster position), while the correlation magnitudes of the non-matching scattered pilot raster positions (shown in FIG. 5 by the undermost curves) remain rather constant. Advantageously, even at −5 dB SNR, $C_{max}(n)$ clearly differentiates from the three non-matching positions.

As a kind of 'measure of robustness', an example defining the protection ration (PR) as:

$$PR(n) = \min\left(\frac{C_{max}(n)}{C_p(n)}\right); p \in \{1, 2, 3, 4\}/\{SPRP(n)\}$$

can be defined. For the following pilots, an additional minimum PR (MPR) can be defined as $MPR = \min(PR(n)); n \in [0;127]$.

FIG. 6 shows examples for the minimum protection rations (MPRs) for three different channel conditions. An example of the MPR vs. signal to noise ratio (SNR) is thus provided. Both 'Rayleigh' and 'SFN' (Single frequency Network) channel models utilize the same tap generation process with the following properties:

| | Rayleigh | | SFN | |
|---|---|---|---|---|
| Tap number | Tap delay (μs) | Tap power (dB) | Tap delay (μs) | Tap power (dB) |
| 1 | 0 | 0 | 0 | −4.8 |
| 2 | — | — | 108.5 | −4.8 |
| 3 | — | — | 195.3 | −4.8 |

Simulations can be done for the 2 k mode with guard interval 1/32, i.e. OFDM symbol duration 224 μs plus 7 μs guard interval. The 'SFN' case may intentionally suffer from extreme inter symbol interference (ISI).

The example of FIG. 6 indicates that the distinguishing of the correlation maximum can be quite reasonably possible if, for example, the numeric value in the example is over 1.0. Preferably, even with the simulated extreme SFN case a minimum protection ration of 1.13 (i.e. no false detections) result at −5 dB SNR can be achieved. Thus the correlation maximum indicating the scattered raster pilot position can advantageously be identified.

Yet another series of simulations can be performed to check the sensitivity to carrier frequency offset in further embodiments as shown in FIG. 7. The FIG. 7 shows the exemplary results for 2 k mode, guard interval 1/32 using a Rayleigh channel profile at 0 dB SNR. Frequency offset is given in percent of the subcarrier spacing. After Post-FFT synchronization, this should be far below 25%.

Figure 9:
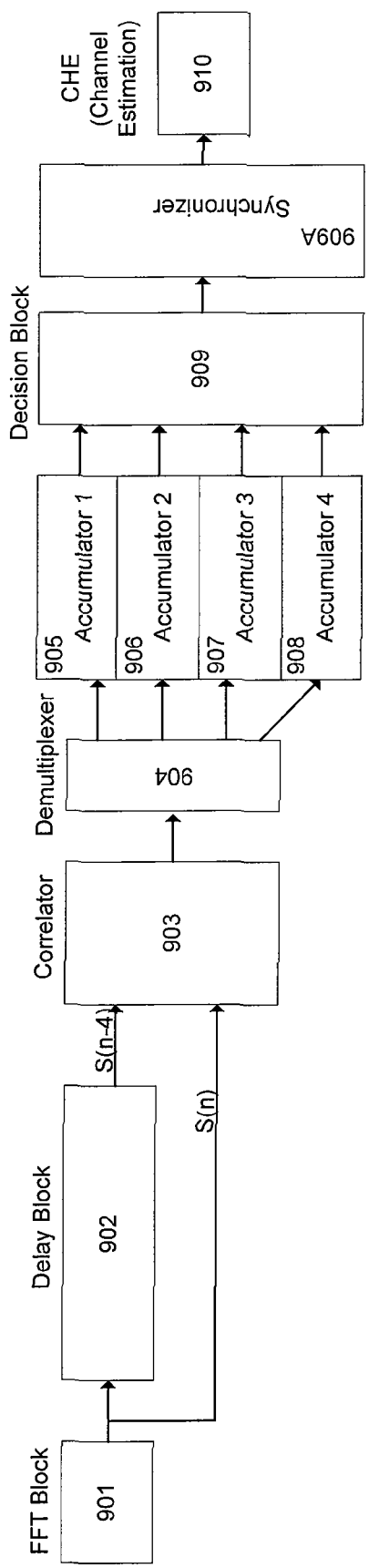
FIG. 9 depicts a partial functional block diagram of a receiver for receiving a transmission in accordance with embodiments of the invention.

Referring to the example of FIG. 7 this shows an interesting effect. Intuitively one would expect the MPR to decrease with increasing carrier frequency offset. But here it first increases for some moderate range of frequency offset until it finally follows the expected behaviour. This effect is most probably due to the used Rayleigh channel profile. With a relatively small frequency shift, the scattered pilot subcarriers might be located at higher magnitudes of the channel transfer function. This would directly improve the MPR. But with further increasing carrier frequency offset, the effect of inter carrier interference (ICI) finally dominates and causes the MPR to drop. Anyhow, within the whole range of carrier frequency offset, an MPR of more than 2.5 can be advantageously maintained. Thus the correlation maximum indicating the scattered raster pilot position can advantageously be identified. A FIG. 8 depicts simulation results of further embodiments comparing minimum protection ratio with Doppler frequency. A series of simulations can be carried out to check the sensitivity to Doppler frequency. Common simulation parameters are 2 k mode, guard interval 1/32, Rayleigh channel profile, and 10% subcarrier spacing offset. The example of FIG. 9 shows the results for 0 dB SNR and 5 dB SNR.

Referring to the example of FIG. 8, as the proposed synchronization scheme is based on correlating the scattered pilots for OFDM symbols apart, it inherently assumes 'quasi-static' channel conditions for this period. Therefore, it is pretty obvious, that this scheme can have some sensitivity to Doppler frequency, as can be seen in FIG. 8. Anyhow, at 5 dB SNR the MPR is >1 up to ≈230 Hz Doppler, i.e. no false detection have occurred in some embodiments. So in the typical range of Doppler the embodiments are clearly operative. Thus the Doppler does not in itself set any limiting factor the invention but the principles can be as well applied in the Doppler sensitive environment. This is advantageous as the mobile receiver typically moves.

One way to deal with an environment with extreme Doppler can be to repeat the fast synchronization procedure for another symbol pair. Thus even more robustness for embodiments of the invention can be achieved by repeating, for example the process of FIG. 3. So the embodied process is performed for a first symbol pair, and the reception is delayed to another symbol pair. Accordingly four symbols are accessed now and the two pairs each are correlated. The second round may verify the results of the first rounds. There can be even more repetition rounds repeating the process for making the recognition and accordingly proper reception more robust.

Various Additional Implementations

FIG. 9 depicts a partial functional block diagram of a receiver for receiving a transmission in accordance with embodiments of the invention. Advantageously, having knowledge of the symbol number, also the position of the scattered pilots can be known, and this can be one goal of the receiver and operations. A decision block (909) is meant to do the maximum search. Some embodiments of the receiver can be adapted to carry out the process of the example of FIG. 3. The receiver comprises a FFT block (901) for performing the FFT for the received multi-carrier signal such as the OFDM signal. The FFT block (901) or the like is coupled with a delay block (902). The FFT block (901) is also coupled with a correlator (903). The delay block (902) is coupled with the correlator (903). A symbol is obtained and received by the FFT (901). The delay block (902) can be adapted to delay the received symbol to some extent in time dependent way. The received symbol can be delayed preferably to certain another symbol. The delay block (902) may then obtain the another symbol.

Referring to the example of FIG. 9, after at least two different symbols are received, the correlator (903) is adapted to calculate a correlation for a carrier pair. Preferably the carriers for the correlation are selected from the different symbols, i.e. first carrier of the first symbol and first carrier of the another symbol. The correlator (903) is coupled with accumulators 1-4 (905-908) via the demultiplexer (904). The accumulators (905-908) are adapted to store the respective correlation calculation results, e.g. correlation C1 can reside in the accumulator 1 (905).

Still referring to FIG. 9, the decision block (909) is adapted to test the correlation results of the accumulators (905-908). Control logic for ending the accumulating of the correlations is omitted in the FIG. 9 for simplicity reasons. It should be noted that the number of the correlations and the respective accumulator are not limited to four as in the example. Preferably, the number correspondences to the releasing correlation index and the number of the another symbol (another compared to the first received), and can be selected in such a way that a certain predetermined known correspondence patter is established for pilot carriers (positions) in a matrix comprising carriers of these two symbols.

Still referring to the FIG. 9, the decision block (909) can advantageously calculate or find a correlation magnitude maximum for the calculated correlations. Preferable, a clear distinct correlation magnitude maximum is found for the correlation indicating the pilot carriers indexes because the scattered pilots are highly correlated, while other data carriers are not.

Thus by sensing possible raster positions of the scattered pilots, a clear distinct correlation magnitude maximum is found for the current scattered pilot raster position.

Yet referring to the FIG. 9, the decision block 909 can be coupled with the channel estimation (CHE) (910) via synchronizer 909A possibly to continue in the receiving process.

Some embodiments may relate to a DVB-T derived standard, called 'DVB-H' which has awoken great deal of interest, and it will most probably support, among others, the feature of 'Time-Slicing'. This will be the key enabler to support DVB-H in small and portable devices, such as mobile phones.

Preferably, the complexity needed for implementing various embodiments of the synchronization technique is fairly low, since most of the required computational resources are anyhow available from post-FFT acquisition. Of course, the post FFT-acquisition computational resources are not only mandatory implementations. For example, a more specific design can be applied as well, or other used circuitry of the receiver applied.

Embodiments of the invention can be implemented in any DVB-T/DVB-H receiver. In an embodiments of the invention this can be done in an ASIC for example.

In yet some of the various embodiments, the block, which will include the scattered pilot synchronization, can be the BUF (Buffer) of the receiver. This buffer block can be used to store the data carriers and scattered pilot carriers of several OFDM symbols in order to allow channel estimation (CHE) to span over several OFDM symbols.

Therefore, at the output of the FFT, there is a demultiplexer that splits the carriers into data carriers, continual pilot carriers, scattered pilot carriers, and possibly TPS carriers. In order to do so, the position of the scattered pilots (the carrier indices of these) has to be known. Position of all the others is constant.

As referred to in the prior art, the traditional way was to use the TPS synchronization that, besides others, determines the OFDM symbol number within an OFDM frame. So this manner of operation may be replaced by the embodiments of the invention.

Figure 10:
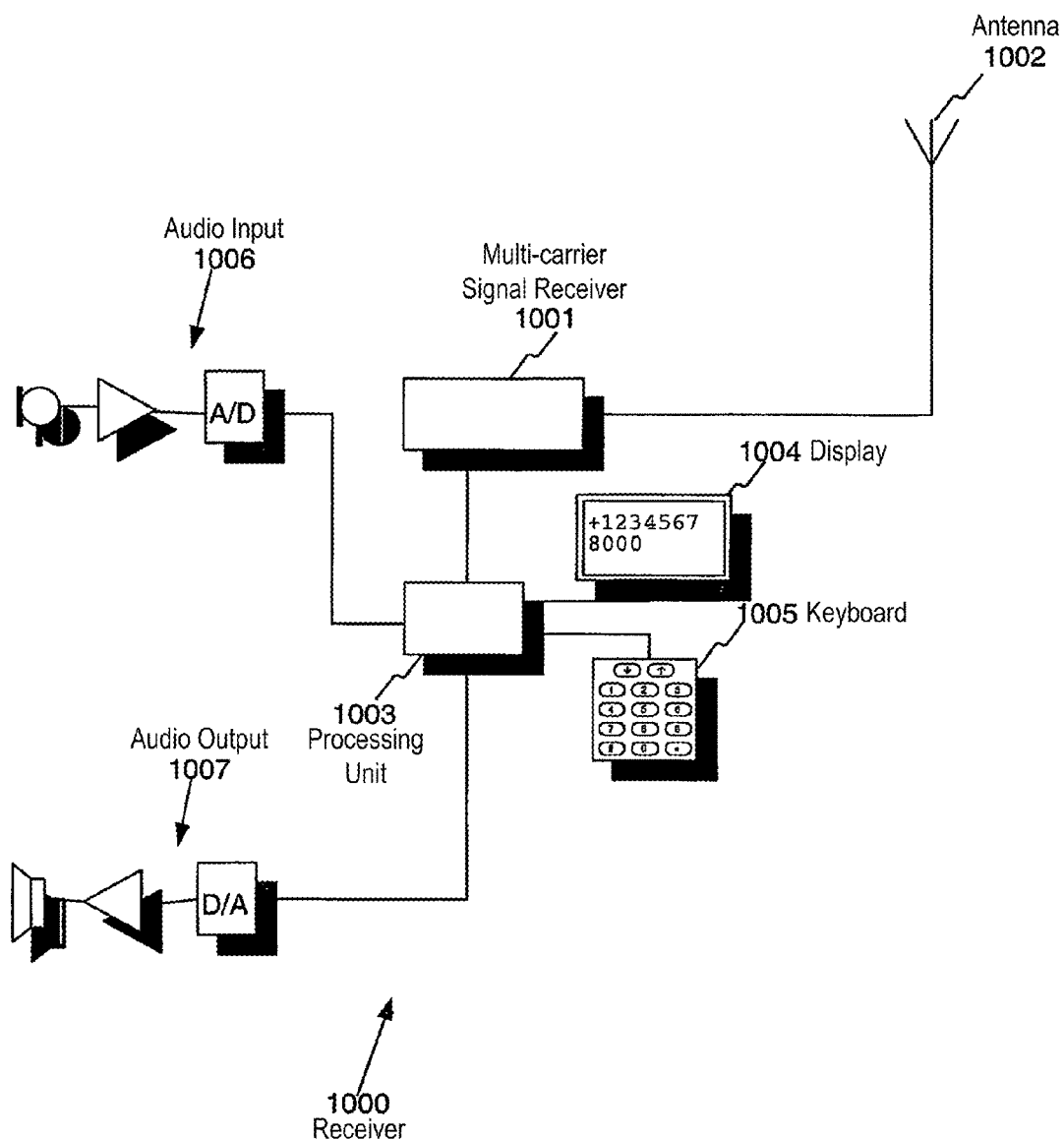
FIG. 10 depicts a general simplified functional block diagram of a receiver for receiving a transmission in accordance with embodiments of the invention.

An example of FIG. 10 depicts a more general functional block diagram of the receiver. The illustrated receiver 1000 may be used in any or all of the various embodiments. The receiver comprises a processing unit (1003), a multi-carrier signal receiver part (1001) (e.g., such as an OFDM signal receiver configured to receive signals via antenna 1002) and a user interface (UI). The user interface comprises a display (1004) and a keyboard (1005). In addition, the UI comprises an audio input (1006), and audio output (1007). The processing unit (1003) comprises a microprocessor (not shown), possibly a memory (not shown) and software (not shown). The processing unit (1003) controls, on the basis of the software, the operations of the receiver 1000, such as receiving a signal, receiving the data stream, receiving of a symbol, receiving another symbol delaying the received symbol, correlating the scattered pilot carriers of the two different symbols, comparing the correlation results, determining the position of the scattered raster pilot position, calculating the symbol in question. Various operations are described in the examples of FIGS. 3-9.

Referring to the FIG. 10, alternatively, middleware or software implementation can be applied (not shown). The receiver 1000 can be a hand-held device or a mobile device which the user can comfortable carry. Advantageously, the receiver 1000 can be a mobile phone which comprises the multi-carrier signal receiver part (1001) such as the OFDM receiver for receiving OFDM signal. The receiver may interact with the service providers.

Figure 11:
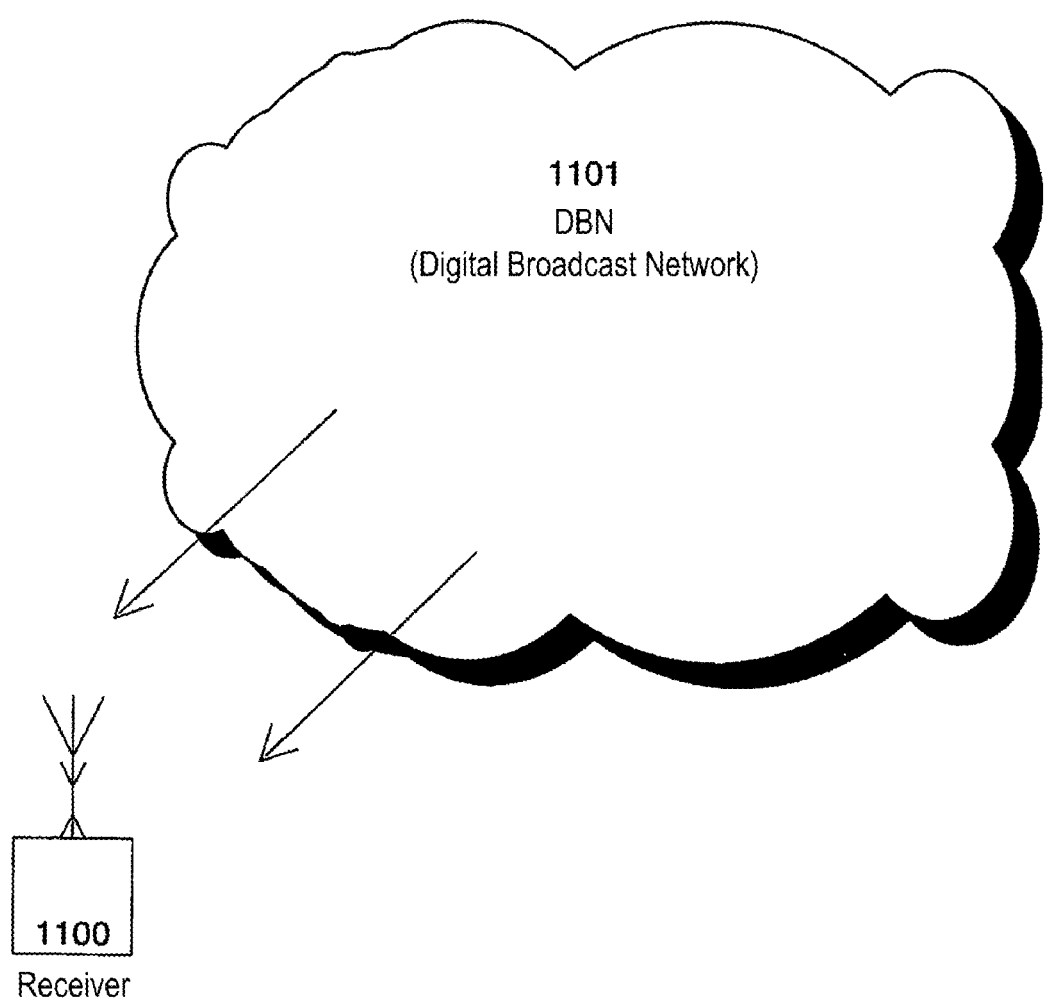
FIG. 11 depicts a general architecture of the system where some principles of the embodiments of the invention can be applied.

Various embodiments of the invention can be applied in the system of FIG. 11. The receiver (1100) operates preferably under coverage of a digital broadcast network (DBN) (1101) applying e.g. OFDM radio signal based transmission. The receiver is capable of receiving the transmission the DBN is providing and receives the OFDM based signal. Operations of the receiver can be receiving a signal, receiving the data stream, receiving of a symbol, receiving another symbol by delaying the reception, correlating the carrier of the two different symbols, comparing the correlation results, determining the position of the scattered raster pilot position, determining the symbol in question. Various operations are described in the examples of FIGS. 3-9.

Ramification and Scope

While there has been described what are believed to be the preferred embodiments of the present invention, those skilled in the art will recognise that other and further changes and modifications may be made thereto without departing from the spirit of the invention, and it is intended to claim all such changes and modifications as fall within the true scope of the invention.

The invention claimed is:

1. A method, comprising:
receiving into an apparatus a multi-carrier transmission time-sliced into bursts, wherein the multicarrier transmission comprises one or more symbols each including a plurality of carriers;
establishing in the apparatus a correspondence pattern matrix for pilot carriers by accessing at least two symbols from the multi-carrier transmission;
correlating in the apparatus carriers of the first symbol with the corresponding carriers of the second symbol within the matrix;
determining in the apparatus a correlation maximum indicating a pilot carrier position; and
synchronizing the apparatus to the multi-carrier transmission bursts by finding the index of received symbols based on the pilot carrier position.

2. The method according to claim 1, wherein the accessed symbols are selected so that the correspondence pattern is adapted to be established between pilot carriers of the symbols for certain carrier positions within the matrix of the symbols.

3. The method according to claim 1, wherein the step of accessing comprises:
receiving the first symbol of the transmission,
delaying the first symbol in relation to the second symbol, wherein the symbols are adapted to establish the correspondence pattern for pilot carriers in the matrix of the two symbols.

4. The method according to claim 1, wherein the accessed symbols comprise currently a received symbol and a certain predetermined other symbol following the currently received symbol.

5. The method according to claim 4, wherein the accessed symbols comprise a currently received symbol and a certain predetermined other symbol following the currently received symbol so that the correspondence pattern is adapted to be established between pilot carriers of the symbols for certain carrier positions within the matrix of the symbols.

6. The method according to claim 4, wherein the certain predetermined other symbol is the fourth symbol received by the apparatus as determined beginning from the currently received symbol.

7. The method according to claim 1, wherein the step of correlating comprises:
performing a first correlation between first possible pilot carrier positions of the first symbol and first possible pilot carrier positions of the second symbol,
performing a second correlation between second possible pilot carrier positions of the first symbol and second possible pilot carrier positions of the second symbol,
performing a third correlation between third possible pilot carrier positions of the first symbol and third possible pilot carrier positions of the second symbol,
performing a fourth correlation between fourth possible pilot carrier positions of the first symbol and fourth possible pilot carrier positions of the second symbol,
detecting the correlation maximum magnitude from the first, second, third, and fourth correlations for indicating the current scattered pilot raster position.

8. The method according to claim 7, wherein the first correlation is calculated based on the following formulae:

$$C_1(n) = \left| \sum_{p=0}^{p_{max}} S(n, 12p+12) \cdot S^*(n-4, 12p+12) \right|,$$

wherein $S(n,c)$ denotes c-th subcarrier of the current symbol and $p_{max}$ denotes last index of the current symbol, which depends on the used mode of the transmission.

9. The method according to claim 7, wherein the second correlation is calculated based on the following formulae:

$$C_2(n) = \left| \sum_{p=0}^{p_{max}} S(n, 12p+3) \cdot S^*(n-4, 12p+3) \right|,$$

wherein $S(n,c)$ denotes c-th subcarrier of the current symbol and $p_{max}$ denotes last index of the current symbol, which depends on the used mode of the transmission.

10. The method according to claim 7, wherein the third correlation is calculated based on the following formulae:

$$C_3(n) = \left| \sum_{p=0}^{p_{max}} S(n, 12p+6) \cdot S^*(n-4, 12p+6) \right|,$$

wherein $S(n,c)$ denotes c-th subcarrier of the current symbol and $p_{max}$ denotes last index of the current symbol, which depends on the used mode of the transmission.

11. The method according to claim 7, wherein the fourth correlation is calculated based on the following formulae:

$$C_4(n) = \left| \sum_{p=0}^{p_{max}} S(n, 12p+9) \cdot S^*(n-4, 12p+9) \right|,$$

wherein $S(n,c)$ denotes c-th subcarrier of the current symbol and $p_{max}$ denotes last index of the current symbol, which depends on the used mode of the transmission.

12. The method according to claim 7, wherein the first correlation is calculated based on the following formulae:

$$C_1(n) = \left| \sum_{p=0}^{p_{max}} S(n, 12p) \cdot S^*(n-4, 12p) \right|,$$

wherein S(n,c) denotes c-th subcarrier of the current symbol and $p_{max}$ denotes last index of the current symbol, which depends on the used mode of the transmission.

13. The method according to claim 7, wherein in the step of detecting the correlation maximum magnitude is based on the following formulae:

$C_{max}(n) = \max(C_p(n)); p \in \{1,2,3,4\}$, wherein $C_p(n)$ denotes the first, second, third, and fourth correlations, p is adapted to determine pilot carrier positions for identifying a certain symbol, and the current scattered pilot raster position (SPRP) is found based on the following formulae:

$$SPRP(n) = \arg\max_p(C_p(n)); p \in \{1, 2, 3, 4\},$$

wherein the $C_p(n)$ denotes the first, second, third, and fourth correlations, p is adapted to determine pilot carrier positions for identifying a certain symbol.

14. The method according to claim 1, wherein the multi-carrier transmission comprises orthogonal frequency-division multiplexing (OFDM) transmission using time slicing, the one or more symbols comprise OFDM symbols and the plurality of carriers comprise data carriers and scattered pilot carriers.

15. The method according to claim 1, wherein the multi-carrier transmission comprises digital video broadcast (DVB) transmission using time slicing based on bursts, and synchronization into the bursts is adapted to be based on the indicated pilot position for finding an indication indicating the orthogonal frequency-division multiplexing (OFDM) symbol.

16. A system, comprising:
means for receiving into an apparatus a multi-carrier transmission time-sliced into bursts, wherein the multicarrier transmission comprises one or more symbols each including a plurality of carriers;
means for establishing in the apparatus a correspondence pattern matrix for pilot carriers by accessing at least two symbols from the multi-carrier transmission;
means for correlating in the apparatus carriers of the first symbol with the corresponding carriers of the second symbol within the matrix for determining a correlation maximum for indicating a pilot carrier position; and
means for synchronizing the apparatus to the multi-carrier transmission bursts by finding the index of received symbols based on the pilot carrier position.

17. A receiver, comprising:
a signal receiver configured to receive a multi-carrier transmission time-sliced into bursts, wherein the multicarrier transmission comprises one or more symbols each including a plurality of carriers;
a Fast Fourier Transform (FFT) block configured to FFT transform the received transmission for obtaining at least two symbols of the transmission;
a delay block configured to delay an obtained first symbol to obtain another symbol, wherein a matrix, comprising the symbols and their respective carriers, is adapted to establish a correspondence pattern for pilot carriers of the first symbol with pilot carriers of the other symbol within the matrix;
a correlator configured to correlate carriers of the symbol with the corresponding carriers of the another symbol within the matrix;
an accumulator configured to accumulate correlation results obtained from the correlator;
a decision block configured to detect a correlation maximum from the correlation results for indicating a pilot carrier position; and
a synchronizer configured to synchronize the receiver to the multi-carrier transmission bursts by finding the index of received symbols based on the pilot carrier position.

18. The receiver according to claim 17, wherein computational resources for performing the operations of at least the correlator and the decision block comprises the same computational resources which are configured to perform a post-FFT acquisition in the receiver.

19. The receiver according to claim 17, wherein a buffer of the receiver is configured to contain the delay block, the correlator, the accumulator, and the decision block.

* * * * *